(12) United States Patent
Kawakami

(10) Patent No.: US 12,555,381 B2
(45) Date of Patent: Feb. 17, 2026

(54) IMAGE PROCESSING APPARATUS, IMAGE PROCESSING METHOD, AND NON-TRANSITORY COMPUTER-READABLE MEDIUM

(71) Applicant: NEC Corporation, Tokyo (JP)

(72) Inventor: Kazuya Kawakami, Tokyo (JP)

(73) Assignee: NEC CORPORATION, Tokyo (JP)

(*) Notice: Subject to any disclaimer, the term of this patent is extended or adjusted under 35 U.S.C. 154(b) by 442 days.

(21) Appl. No.: 18/017,459

(22) PCT Filed: Jul. 28, 2020

(86) PCT No.: PCT/JP2020/028861
§ 371 (c)(1),
(2) Date: Jan. 23, 2023

(87) PCT Pub. No.: WO2022/024212
PCT Pub. Date: Feb. 3, 2022

(65) Prior Publication Data
US 2023/0334867 A1    Oct. 19, 2023

(51) Int. Cl.
*G06V 20/52* (2022.01)
*G06T 7/20* (2017.01)
*G06T 7/70* (2017.01)

(52) U.S. Cl.
CPC ............... *G06V 20/52* (2022.01); *G06T 7/20* (2013.01); *G06T 7/70* (2017.01);
(Continued)

(58) Field of Classification Search
None
See application file for complete search history.

(56) References Cited

U.S. PATENT DOCUMENTS

| | | | | |
|---|---|---|---|---|
| 2007/0222566 A1* | 9/2007 | Tsuji | .................... | G06V 20/56 348/148 |
| 2014/0112538 A1* | 4/2014 | Ogawa | .................. | G06V 40/25 382/103 |
| 2020/0218910 A1* | 7/2020 | Herman | .................... | B60R 1/27 |

FOREIGN PATENT DOCUMENTS

| | | | | |
|---|---|---|---|---|
| CN | 111222404 A | * | 6/2020 | ......... G06K 9/00288 |
| JP | 2005-280526 A | | 10/2005 | |

(Continued)

OTHER PUBLICATIONS

International Search Report for PCT Application No. PCT/JP2020/028861, mailed on Oct. 20, 2020.

(Continued)

*Primary Examiner* — Delomia L Gilliard
(74) *Attorney, Agent, or Firm* — Sughrue Mion, PLLC

(57) ABSTRACT

An image processing apparatus includes an image processing unit and a determination unit. The image processing unit acquires a plurality of images (e.g., frame images) generated by an image capturing apparatus. Then, the image processing unit processes an image including the same person (a first person) among the plurality of images, and thereby detects a change in an angle of a body of the first person. Moreover, the image processing unit detects, at least when magnitude of the change satisfies a criterion, information relating to a second person or an object (an attention target) existing in a direction in which the body leans. The determination unit outputs predetermined information by use of a processing result of the image processing unit. As one example, the determination unit outputs predetermined information, when a first criterion relating to at least one of the attention target and the first person described above is satisfied.

15 Claims, 9 Drawing Sheets

(52) U.S. Cl.
CPC .............. *G06T 2207/30196* (2013.01); *G06T 2207/30232* (2013.01); *G06V 2201/08* (2022.01)

(56) References Cited

FOREIGN PATENT DOCUMENTS

| | | | |
|---|---|---|---|
| JP | 2007-279808 A | | 10/2007 |
| JP | 2010-015466 A | | 1/2010 |
| JP | 2010165003 A | * | 7/2010 |
| JP | 2010-204912 A | | 9/2010 |
| JP | 2011-211438 A | | 10/2011 |
| JP | 2017-224249 A | | 12/2017 |
| JP | 2019-029812 A | | 2/2019 |
| JP | 2019159624 A | * | 9/2019 |
| JP | 2019-197552 A | | 11/2019 |
| JP | 6669240 B1 | | 3/2020 |
| JP | 2020-071505 A | | 5/2020 |
| WO | 2012/172629 A1 | | 12/2012 |
| WO | 2018/037355 A1 | | 3/2018 |

OTHER PUBLICATIONS

JP Office Action for JP Application No. 2024-001273, mailed on Nov. 19, 2024 with English Translation.
JP Office Action for JP Application No. 2024-001273, mailed on Feb. 12, 2025 with English Translation.

\* cited by examiner

| TIME | IMAGE DATA | ANALYSIS RESULT |
|---|---|---|
| ... | ... | ... |
| ... | ... | ... |
| ... | ... | ... |

FIG. 5

ANALYSIS RESULT

| FEATURE VALUE | POSITION | LEAN |
|---|---|---|
| ... | ... | ... |
| ... | ... | ... |
| ... | ... | ... |

IMAGE PROCESSING APPARATUS, IMAGE PROCESSING METHOD, AND NON-TRANSITORY COMPUTER-READABLE MEDIUM

This application is a National Stage Entry of PCT/JP2020/028861 filed on Jul. 28, 2020, the contents of all of which are incorporated herein by reference, in their entirety.

TECHNICAL FIELD

The present invention relates to an image processing apparatus, an image processing method, and a program.

BACKGROUND ART

In recent years, image processing is performed with an aim of securing safety. For example, Patent Document 1 describes providing an image acquisition unit such as an intercom in each residence within a specific area, and sensing, by use of the image acquisition unit and an image of a previously registered resident, that a person other than a resident has taken a suspicious act.

Moreover, Patent Document 2 describes, in a region (e.g., within a recreational facility such as an amusement park, a park, a movie theater, or a concert hall, or a facility such as a department store or a large shopping mall) where a move is made in a state of carrying a ticket, grouping a companion by use of identification information given to a ticket, reading the identification information in the ticket at exit, and thereby determining whether exit has been performed together with a person other than the grouped person.

RELATED DOCUMENT

Patent Document

Patent Document 1: Japanese Patent Application Publication No. 2017-224249
Patent Document 2: Japanese Patent Application Publication No. 2010-204912

SUMMARY OF THE INVENTION

Technical Problem

There is fear that a risk such as being forced a move that a person does not intend occurs in the person. One example of an object of the present invention is sensing, by image processing, that a risk is occurring in a person.

Solution to Problem

The present invention provides an image processing apparatus including:
an image processing unit that processes a plurality of images including a first person and being generated at timings differing from each other; and
a determination unit that outputs predetermined information by use of a processing result of the image processing unit, in which
the image processing unit
detects a change in an angle of a body of the first person, by processing the plurality of images, and
detects, at least when magnitude of the change satisfies a criterion, information relating to an attention target being a second person or an object existing in a direction in which the body leans, and
the determination unit outputs the predetermined information, when a first criterion relating to at least one of the attention target and the first person is satisfied.

The present invention provides an image processing method including,
performing, by a computer:
image processing of processing a plurality of images including a first person and being generated at timings differing from each other; and
determination processing of outputting predetermined information by use of a processing result of the image processing, in which
the computer
in the image processing,
detects a change in an angle of a body of the first person, by processing the plurality of images,
detects, at least when magnitude of the change satisfies a criterion, information relating to an attention target being a second person or an object existing in a direction in which the body leans, and,
in the determination processing, outputs the predetermined information, when a first criterion relating to at least one of the attention target and the first person is satisfied.

The present invention provides a program causing a computer to include:
an image processing function of processing a plurality of images including a first person and being generated at timings differing from each other; and
a determination function of outputting predetermined information by use of a processing result of the image processing function, in which
the image processing function
detects a change in an angle of a body of the first person, by processing the plurality of images, and
detects, at least when magnitude of the change satisfies a criterion, information relating to an attention target being a second person or an object existing in a direction in which the body leans, and
the determination function outputs the predetermined information, when a first criterion relating to at least one of the attention target and the first person is satisfied.

Advantageous Effects of Invention

The present invention can sense, by image processing, that a risk is occurring in a person.

BRIEF DESCRIPTION OF THE DRAWINGS

The above-described object, other objects, features, and advantageous effects will become more apparent from a preferred example embodiment described below and the following accompanying drawings.

FIG. 4 is a diagram illustrating one example of information stored by a storage unit.

FIG. 5 is a diagram illustrating one example of an analysis result stored by the storage unit.

DESCRIPTION OF EMBODIMENTS

Hereinafter, an example embodiment of the present invention is described by use of the drawings. Note that, in all of the drawings, a similar component is assigned with a similar reference sign, and description thereof is omitted, as appropriate.

EXAMPLE EMBODIMENT

Figure 1:
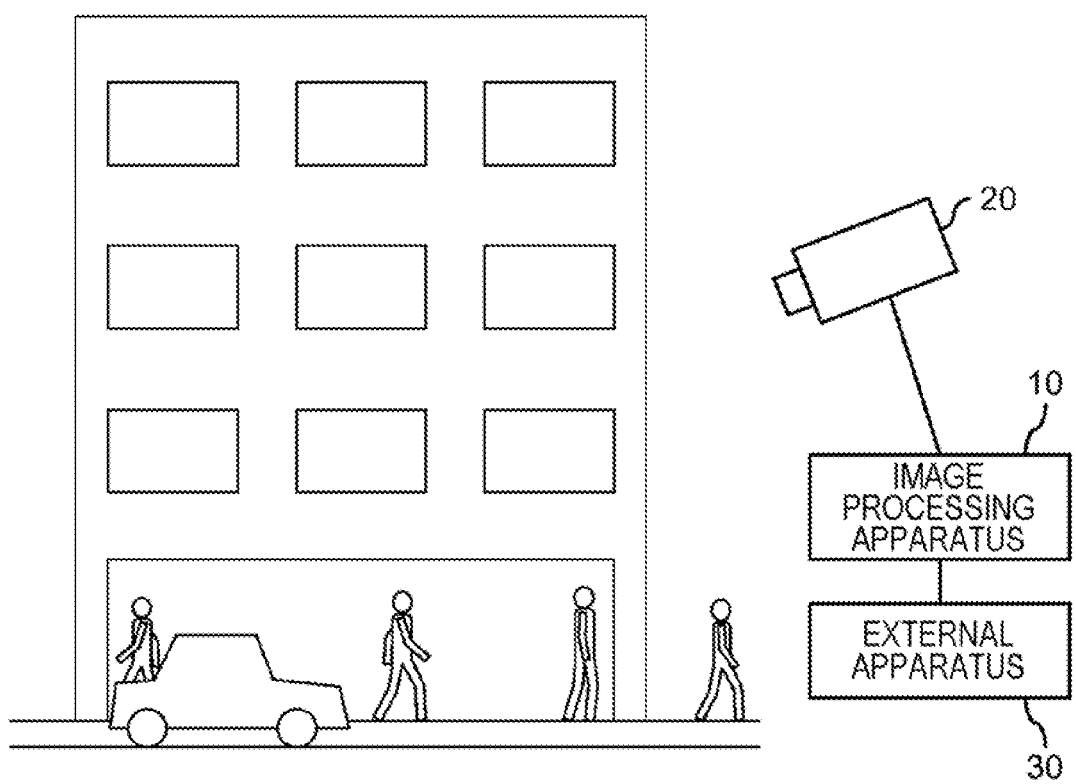
FIG. 1 is a diagram for describing a usage environment of an image processing apparatus according to an example embodiment.

FIG. 1 is a diagram for describing a usage environment of an image processing apparatus 10 according to an example embodiment. The image processing apparatus 10 is used together with at least one of (preferably a plurality of) image capturing apparatuses 20.

The image capturing apparatus 20 is placed in a target area such as a street (e.g., a road) or an indoor place, and used as a, for example, a surveillance camera. The image capturing apparatus 20 may be placed in a predetermined place, or may be held to a moving body (e.g., at least one of a surveillant, a police officer, and a vehicle) moving in a target area. When a plurality of the image capturing apparatuses 20 are placed in a target area, the plurality of the image capturing apparatuses 20 are placed in places away from each other. In this case, a target area is preferably covered by image capturing ranges of a plurality of the image capturing apparatuses 20. Then, a part of an image capturing range of at least one image capturing apparatus 20 may overlap an image capturing range of the image capturing apparatus 20 positioned next to the at least one image capturing apparatus 20.

A frame rate of an image generated by the image capturing apparatus 20 is, for example, equal to or more than 0.5 frames/second, but may be equal to or less than 0.5 frames/second. Then, the image capturing apparatus 20 immediately transmits the generated image to the image processing apparatus 10 together with a generation time of the image. When a plurality of the image capturing apparatuses 20 are placed, each of the image capturing apparatuses 20 also transmits identification information of the image capturing apparatus 20 together with an image. Herein, when the image capturing apparatus 20 is held to a moving body, the image capturing apparatus 20 transmits position information (e.g., information based on a GPS) indicating a position at the time when the image capturing apparatus 20 generates the image, to the image processing apparatus 10, together with identification information or instead of identification information.

The image processing apparatus 10 processes the image acquired from the image capturing apparatus 20, and thereby determines whether a risk is occurring in a person being present in a target area. As a risk, for example, being forced an act or move that the person does not intend can be cited, such as kidnapping or abduction. In this case, a person in which a risk is occurring is mostly pulled by another person. The image processing apparatus 10 senses this state.

The image processing apparatus 10 outputs predetermined information, when determining that a risk is occurring in a person being present in a target area. When the image processing apparatus 10 includes a display, an output destination of the predetermined information may be the display, or may be an apparatus (hereinafter, referred to as an external apparatus 30) differing from the image processing apparatus 10. The predetermined information indicates that a risk is occurring in a person being present in a target area, but preferably further includes at least one of, for example, information indicating a position of the person in which a risk is occurring, and an image of the person.

The external apparatus 30 may be a display, may be a terminal placed in a surveillance center, or may be a terminal carried by a person being present in a surveillance center, or a surveillant or a police officer being present in a target area. The external apparatus 30 performs predetermined display when acquiring predetermined information from the image processing apparatus 10. The predetermined display indicates that a risk is occurring in a person being present in a target area. Moreover, when predetermined information output by the image processing apparatus 10 includes at least one of information indicating a position of a person in which a risk is occurring, and an image of the person, the predetermined display performed by the external apparatus 30 preferably includes the information and/or the image.

Note that, the image processing apparatus 10 may be disposed in a surveillance center, or may be a so-called cloud server.

Figure 2:
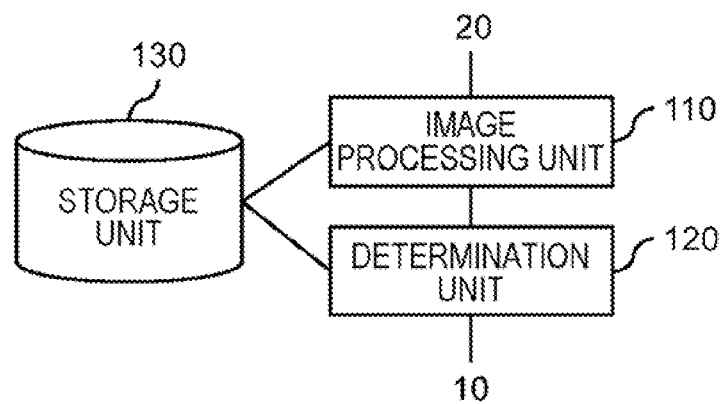
FIG. 2 is a diagram illustrating one example of a functional configuration of the image processing apparatus.

FIG. 2 is a diagram illustrating one example of a functional configuration of the image processing apparatus 10. The image processing apparatus 10 includes an image processing unit 110 and a determination unit 120.

The image processing unit 110 acquires a plurality of images (e.g., frame images) generated by the image capturing apparatus 20. The plurality of images acquired by the image processing unit 110 are generated at timings differing from each other. Herein, the image processing unit 110 may acquire an image generated by each of a plurality of the image capturing apparatuses 20. Then, the image processing unit 110 processes an image including the same person (hereinafter, referred to as a first person) among a plurality of images, and detects a change in an angle of a body of the first person. In the detection, the image processing unit 110 may use a plurality of images generated by a plurality of the image capturing apparatuses 20.

Moreover, the image processing unit 110 detects, at least when magnitude of the change satisfies a criterion, information relating to a second person or an object (hereinafter, referred to as an attention target) existing in a direction in which the body leans. Information detected herein is at least presence or absence of the attention target described by use of FIG. 1, and a kind thereof. An object that can become an attention target is, for example, a vehicle such as an automobile, or a building.

Herein, when a change in an angle of the body of the first person satisfies the criterion (e.g., becoming equal to or more than a criterion value), and the second person exists as an attention target, there is a possibility that the first person is pulled by the second person. Moreover, when the change in the angle of the body of the first person satisfies the criterion, and an object such as a vehicle or a building exists as an attention target, there is a possibility that the first person is pulled by a person being present in the object.

The determination unit 120 outputs predetermined information by use of a processing result of the image processing unit 110. As one example, the determination unit 120 outputs the predetermined information, when a first criterion relating to at least one of the attention target and the first person described above is satisfied. A specific example of the first criterion is described later by use of a flowchart. Moreover, a specific example of predetermined information is as described by use of FIG. 1.

Figure 3:
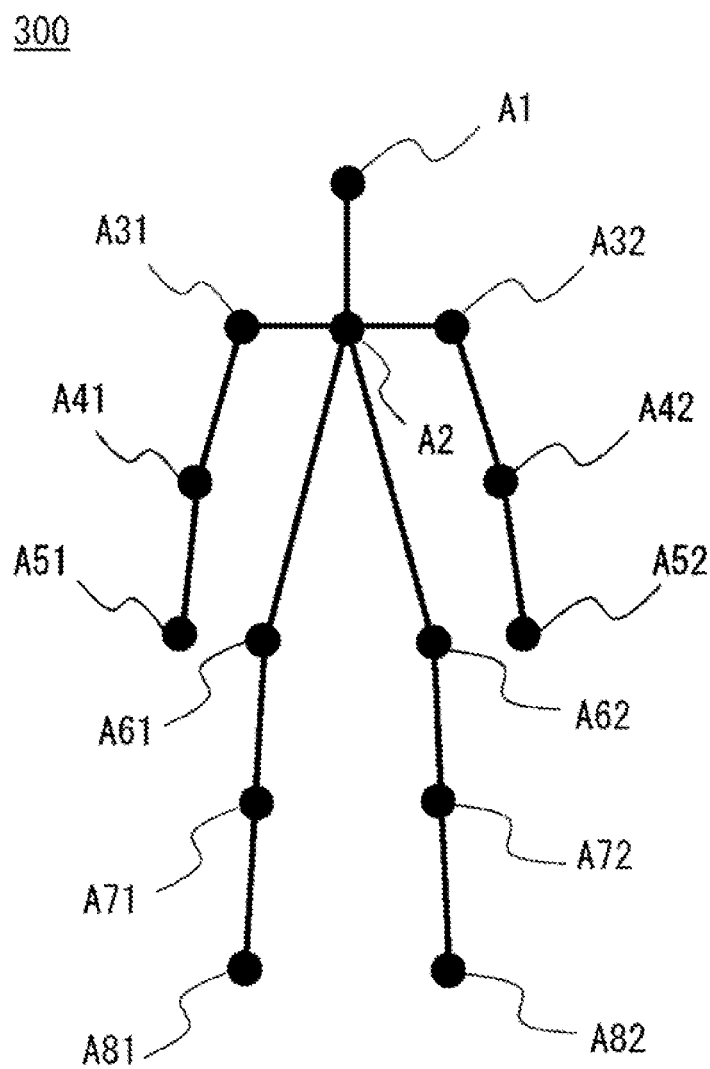
FIG. 3 is a diagram for describing processing performed by an image processing unit.

Note that, the image processing unit 110 determines a lean of a person by use of, for example, relative positions of a plurality of predetermined parts of the first person. A plurality of predetermined parts are, for example, a head A1, a neck A2, a right shoulder A31, a left shoulder A32, a right elbow A41, a left elbow A42, a right hand A51, a left hand A52, a right waist A61, a left waist A62, a right knee A71, a left knee A72, a right foot A81, and a left foot A82, as illustrated in FIG. 3. Then, a pose of a person is represented by a line connecting adjacent keypoints. Then, the image processing unit 110 determines an index indicating a lean of a person by use of the lines. As one example, the image processing unit 110 uses, as indices indicating a lean of a body of a person, a lean of a line connecting the neck and the right waist, and a lean of a line connecting the neck and the left waist.

In the example illustrated in FIG. 2, the image processing apparatus 10 further includes a storage unit 130. The storage unit 130 stores information necessary when the image processing unit 110 and the determination unit 120 perform processing, and also stores an analysis result of an image by the image processing unit 110, and information acquired from the image capturing apparatus 20 together with the image.

Note that, information stored by the storage unit 130 may include a model generated by, for example, machine learning. The model inputs, for example, an image or a feature value thereof (e.g., a relative position of a predetermined part of the person described above), and outputs a lean of a person included in the image. When a plurality of the image capturing apparatuses 20 are placed in a target area, the model may be generated for each of the plurality of the image capturing apparatuses 20.

Moreover, information stored by the storage unit 130 may include information for computing, by use of a position (x, y coordinates) of a person in an image, a position, in a real space, of the person. The information is set for each of the image capturing apparatuses 20, by, for example, preliminary learning.

Figure 4:
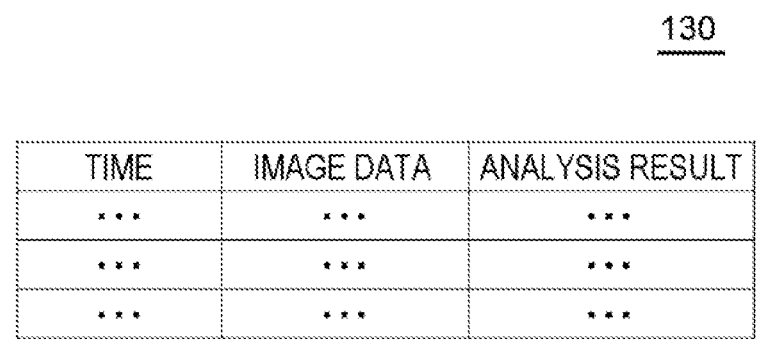

FIG. 4 is a diagram illustrating one example of information stored by the storage unit 130. The storage unit 130 stores each of a plurality of images generated by the image capturing apparatus 20, together with a generation time of the image, and an analysis result of the image by the image processing unit 110. When a plurality of the image capturing apparatuses 20 are placed, the storage unit 130 stores, for each of the plurality of the image capturing apparatuses 20, an image generated by the image capturing apparatus 20, a generation time of the image, and an analysis result of the image. As one example, the storage unit 130 stores each piece of the information described above, in association with identification information of the image capturing apparatus 20 that has generated the image. Note that, when the image capturing apparatus 20 is held to a moving body, the storage unit 130 further stores, for each image, position information of the image capturing apparatus 20 at the time when the image is generated.

FIG. 5 is a diagram illustrating one example of an analysis result stored by the storage unit 130. The storage unit 130 stores, for each image, information indicated in the present figure. In the example illustrated in the present figure, the storage unit 130 stores a feature value of a person included in the image, a position of the person, and a lean of the person. Herein, the position of the person is preferably a position in a real space. Herein, the image processing unit 110 computes a position of the person in a real space, by use of the above-described information stored in the storage unit 130 in relation to identification information of the image capturing apparatus 20 that has generated the image, and a position (x, y coordinates) of the person within the image. Note that, when the image capturing apparatus 20 is held to a moving body, a position of the person in a real space is computed by use of position information of the image capturing apparatus at generation of the image, a direction and a field angle of the image capturing apparatus 20, and a position of the person within the image. Then, the image processing unit 110 determines whether a person included in an image generated at a certain timing and a person included in an image generated at another certain timing are the same person, by use of a feature value of the person. Moreover, the image processing unit 110 determines whether a person included in an image captured by a certain image capturing apparatus 20 and a person included in an image captured by another image capturing apparatus 20 at the same timing are the same person, by use of at least one (preferably both) of a feature value of the person and a position in a real space.

Then, the image processing unit 110 determines a change in a lean of a certain person, by use of a difference between a lean of the person in a past image (e.g., an image a predetermined number of images before or a predetermined time before) stored by the storage unit 130, and a lean of the person in a currently newly acquired image. A time difference between a generation timing of the past image used herein and a current time is, for example, equal to or more than 1 second and equal to or less than 5 seconds.

Figure 6:
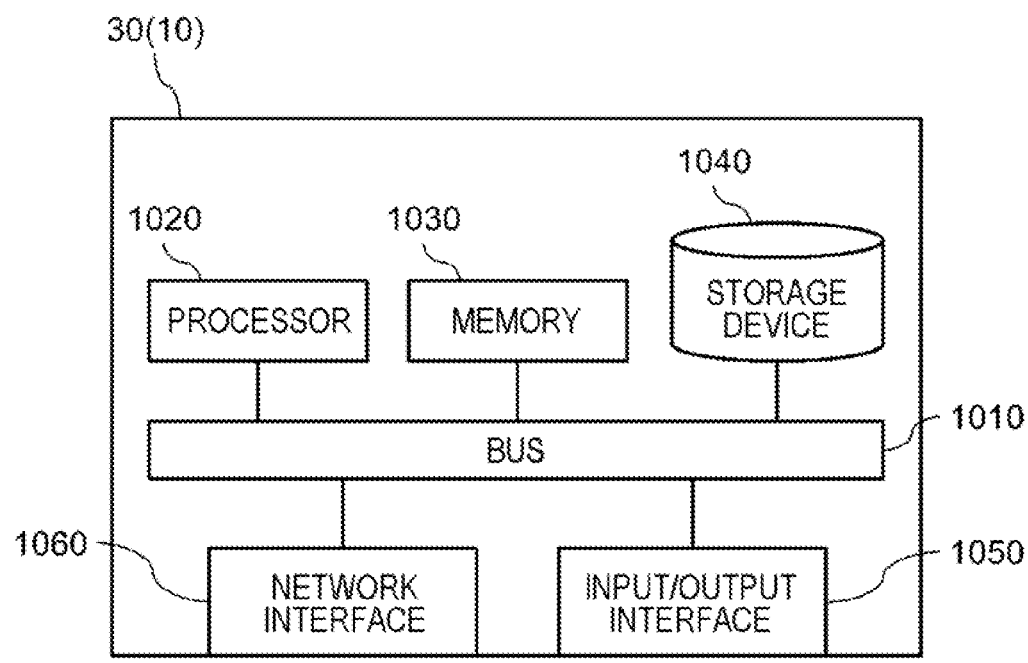
FIG. 6 is a diagram illustrating a hardware configuration example of the image processing apparatus.

FIG. 6 is a diagram illustrating a hardware configuration example of the image processing apparatus 10. The image processing apparatus 10 includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit/receive data to/from one another. However, a method of mutually connecting the processor 1020 and the like is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function (e.g., the image processing unit 110 and the determination unit 120) of the image processing apparatus 10. The processor reads each of the program modules onto the memory 1030, executes the read program module, and thereby achieves each function being relevant to the program module. Moreover, the storage device 1040 also functions as the storage unit 130.

The input/output interface 1050 is an interface for connecting the image processing apparatus 10 to various kinds of pieces of input/output equipment. For example, the image processing apparatus 10 communicates with the external apparatus 30 via the input/output interface 1050.

The network interface 1060 is an interface for connecting the image processing apparatus 10 to a network. The network is, for example, a local area network (LAN) or a wide area network (WAN). A method of connecting the network interface 1060 to a network may be wireless connection, or may be wired connection. The image processing apparatus 10 communicates with the image capturing apparatus 20 via the network interface 1060. Moreover, the image processing apparatus 10 may communicate with the external apparatus 30 via the network interface 1060.

Figure 7:
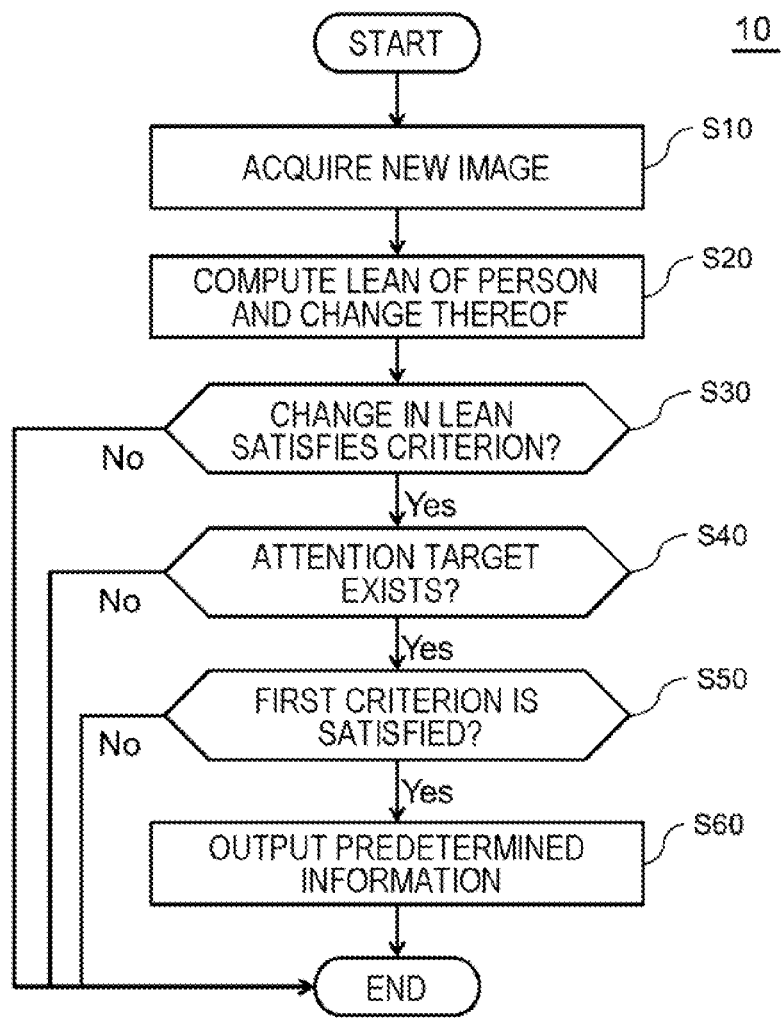
FIG. 7 is a flowchart illustrating one example of processing performed by the image processing apparatus.

FIG. 7 is a flowchart illustrating one example of processing performed by the image processing apparatus 10. The image processing apparatus 10 performs processing illustrated in the present figure, each time an image is acquired from the image capturing apparatus 20.

When a new image is acquired from the image capturing apparatus 20 (step S10), the image processing unit 110 of the image processing apparatus 10 detects a feature value of a person included in the image and a position thereof, and detects an object included in the image and a position thereof. The object detected herein is at least an object (e.g., a vehicle or a building) that can become an attention target. Moreover, the image processing unit 110 computes a lean of a person included in the image. Then, the image processing unit 110 computes a change in a lean of a person included in the image acquired in step S10, by use of a past processing result stored in the storage unit 130, and a processing result in step S20 (step S20). Herein, when a plurality of persons are included in one image, the image processing unit 110 computes, regarding each of the plurality of persons, a change in a lean of the person.

Next, the determination unit 120 of the image processing apparatus 10 determines whether a change in a lean satisfies a criterion, for example, a change in a lean during a predetermined time is equal to or more than a criterion value (step S30). When the criterion is satisfied (step S30), the determination unit 120 determines whether an attention target exists in a direction in which the person (first person) leans, around the person (step S40). In the processing, the positions of the person and the object detected in step S20 are used.

When an attention target exists (step S40: Yes), the determination unit determines whether a first criterion relating to at least one of the attention target and the first person is satisfied (step S50).

For example, when the attention target is a second person, the first criterion includes a matter indicating that the second person is not a companion of the first person.

For example, in a case where the image capturing apparatus 20 is placed at an entrance of a target area, the image processing unit 110 handles a plurality of persons as one group when distances between the plurality of persons are within a criterion distance continuously for equal to or more than a criterion time, in an image generated by the image capturing apparatus 20. In this instance, the image processing unit 110 may handle persons holding hands as one group, or may handle, as one group, persons repeating a state of facing each other (or when a given time continues). Then, the image processing unit 110 stores feature values of persons constituting the same group, in the storage unit in association with each other. Then, the determination unit 120 determines, by use of the information, whether the second person belongs to the same group as the first person, i.e., whether the second person is a companion of the first person.

Moreover, the determination unit 120 may determine whether the second person is a companion, by use of, for example, a distance between the first person and the second person before magnitude of a change satisfies a criterion. In this case, the determination unit 120 determines, by use of, for example, a past processing result stored in the storage unit 130, that the second person is not a companion of the first person when a distance between the first person and the second person is wide at equal to or more than a criterion distance continuously for equal to or more than a criterion time. The criterion time is, for example, equal to or more than 10 seconds. Moreover, the criterion distance is, for example, equal to or more than 2 m. Herein, even when the second person is not detected, the determination unit 120 determines separation being equal to or more than a criterion distance.

Moreover, when the attention target is an object such as a vehicle or a building, the first criterion is that, after magnitude of a change satisfies a criterion, the first person is not sensed any more within the criterion time from an image generated by the image capturing apparatus 20 generating the image in which the first person is detected in step S20, without framing out from the image capturing apparatus 20. Such a condition is set because, when the condition is satisfied, a possibility that the first person has been taken (or pushed) into a vehicle or a building is high.

Note that, the image processing unit 110 can presume an attribute of the first person from a feature value of the first person. Then, the determination unit 120 may use, as the first criterion, satisfaction of a criterion by an attribute of the first person, and existence of an attention target. Herein, a criterion to be satisfied by an attribute of the first person is at least one of a criterion that the first person is a child and a criterion that the first person is a woman. The image processing unit 110 can determine whether a person included in an image is a child, by use of, for example, whether a height of the first person is equal to or less than a criterion value (e.g., a predetermined value being equal to or less than 120 cm). Moreover, the image processing unit 110 can determine a gender of the first person by use of a feature value of the first person.

Then, when the first criterion is satisfied (step S50: Yes), the determination unit 120 outputs predetermined information (step S60). A content and an output destination of the predetermined information are as described by use of FIG. 1. Note that, when the attention target is a vehicle, and a number on a license plate of the vehicle can be presumed or determined by image processing by the image processing unit 110, the predetermined information may include the number. In this instance, the predetermined information may include a position of the vehicle when step S50 is satisfied. Moreover, when the attention target is a building, the predetermined information may include position information (e.g., an address) of the building and a name of the building. The determination unit 120 determines the position information by use of, for example, identification information of the image capturing apparatus 20 that has generated the image, and a position of the building within the image. Note that, the position information and name of the building may be previously stored in the storage unit 130 in association with the identification information of the image capturing apparatus 20, and the position of the building within the image.

Thereafter, the predetermined information or a warning display based on the predetermined information is displayed on the external apparatus 30 or a large-size display connected thereto. The display may be displayed over, for example, a map image displayed in a screen. A display position in this case is preferably equivalent to, for example, a position of the attention target.

Then, when the external apparatus 30 is disposed in a surveillance center, a person being present in the surveillance center determines presence or absence of criminal nature, and inputs a determination result to the external apparatus 30, by comprehensively determining the predetermined information displayed on the external apparatus 30 or the like and other pieces of information. Note that, the external apparatus 30 may perform the processing. In this case, the external apparatus 30 may use a model generated by machine learning.

Then, when it is determined that there is criminal nature, the image processing apparatus 10 or the external apparatus 30 may identify a police officer or a guard (hereinafter, referred to as a police officer) expected to be able to reach a position (i.e., a position where a crime is presumed to have occurred) of an attention target earliest, and transmit, to a terminal carried by the police officer, the position of the attention target when step S50 is satisfied. A terminal to be a transmission destination is selected by use of, for example, position information and a velocity (including a movement direction) of the terminal at the time. Note that, a position of the terminal (I.e., a position of the police officer) is computed by use of, for example, a GPS, and a velocity is computed by use of a positional history. Note that, when a velocity is used, a movement means (e.g., a foot, a bicycle, an automobile, or a motorbike) or the like of the police officer can be presumed. When selecting a police officer, the image processing apparatus 10 or the external apparatus 30 may use the movement means instead of a velocity.

Note that, a mark indicating a position of a police officer being present around, and a movement means may be also additionally displayed in a screen of the external apparatus 30 or the like.

Herein, information transmitted to a terminal and displayed on the terminal may further include a degree of urgency or a kind of an assumed crime, a tool necessary for coping, display (e.g., a selection button) for selecting whether a response can be made, and information (hereinafter, referred to as a ready-to-respond time) indicating by when to arrive. In this case, the police officer carrying the terminal determines, by use of the displayed information, whether he/she is ready to respond, and operates the terminal according to a determination result. The terminal transmits an investigation result, i.e., a selection result to the image processing apparatus 10 or the external apparatus 30.

Herein, when the police officer selects being ready to respond, the image processing apparatus 10 or the external apparatus 30 generates information indicating a movement path (e.g., a shortest path) from a current position of the terminal to a position where a crime is presumed to have been occurring, transmits the information to the terminal, and causes the information to be displayed on the terminal. In this instance, the image processing apparatus 10 or the external apparatus 30 may compute an expected arrival time by use of a current time and a congestion degree in the movement path, transmit the expected arrival time to the terminal, and causes the expected arrival time to be displayed on the terminal.

On the other hand, when the police officer selects being unready to respond, the image processing apparatus 10 or the external apparatus 30 performs the processing described above, for a terminal carried by a police officer expected to be able to reach the position of the attention target next to the former police officer.

Note that, when being ready to respond is selected, the image processing apparatus 10 or the external apparatus 30 may further transmit the following information to a terminal.

an image and detailed information (e.g., an owner or the like) of the attention target (e.g., a vehicle)

audio data recorded around the attention target in step S50 a list of persons (e.g., material witnesses) to be heard

Note that, when receiving a list of persons (e.g., material witnesses) to be heard, a terminal carried by a police officer may display, for each person included in the list, hearing unimplemented, hearing in action, or hearing completed. In this case, "hearing unimplemented" is displayed for all of the persons at first. Then, the police officer operates the terminal in response to progress of hearing, changes "hearing unimplemented" to "hearing in action", and changes "hearing in action" to "hearing completed". Then, the terminal transmits information indicating the change to the image processing apparatus or the external apparatus 30.

Note that, when the police officer is equipped with a sensor such as a camera or a microphone, the terminal may save data detected by the sensor during hearing, or may transmit the data to the image processing apparatus 10 or the external apparatus 30. When saving data, the terminal may convert audio data into text data, extract necessary information from the text data, and save the necessary information.

As above, according to the present example embodiment, the image processing apparatus 10 computes a change in a lean of a person existing in a target area, by processing an image generated by the image capturing apparatus 20. Then, when the change in the lean satisfies a criterion, an attention target being a second person or an object existing in a direction in which a body leans exists, and a first criterion relating to at least one of the attention target and the first person is satisfied, predetermined information is output, because a possibility that a risk is occurring in the person is high. Therefore, a risk being occurring in the person can be sensed by image processing.

Note that, the determination unit 120 may omit step S50 in FIG. 7. In this case, when a change in a lean of the first person satisfies a criterion, and an attention target exists, the determination unit 120 outputs predetermined information without determining whether a first condition is satisfied.

Modified Example 1

Figure 8:
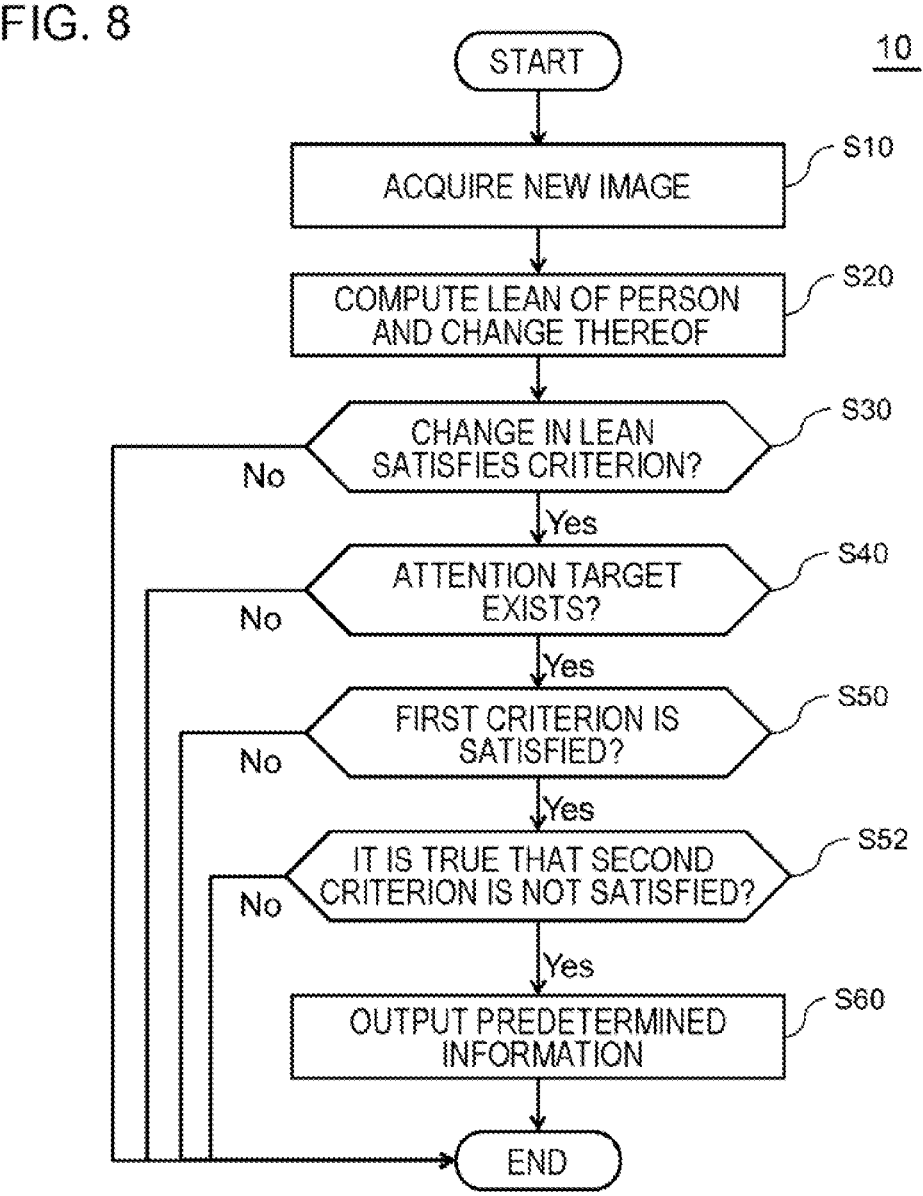
FIG. 8 is a flowchart according to a modified example 1 in FIG.

FIG. 8 is a flowchart according to a modified example 1 in FIG. 7. In the present modified example, a determination unit 120 of an image processing apparatus 10 sets, as a condition for performing processing illustrated in step S60, that, after a first criterion is satisfied (step S50: Yes), a second criterion, i.e., an exception condition is not satisfied (step S52: Yes). As an exception condition, for example, increasing of a distance between a first person and an attention target after a predetermined time has elapsed can be cited.

According to the present modified example, when a second condition being an exception condition is satisfied, the determination unit 120 does not output predetermined information even though a first condition is satisfied. Therefore, sensing accuracy of occurrence of a risk in a person becomes high. Note that, in the present modified example, when a second criterion, i.e., an exception condition is satisfied, an image indicating an attention target (e.g., a second person or a vehicle) may be stored in a storage unit 130. This is because there is a possibility that the second person or the vehicle in this instance causes a risk to occur in another person in future.

Modified Example 2

Figure 9:
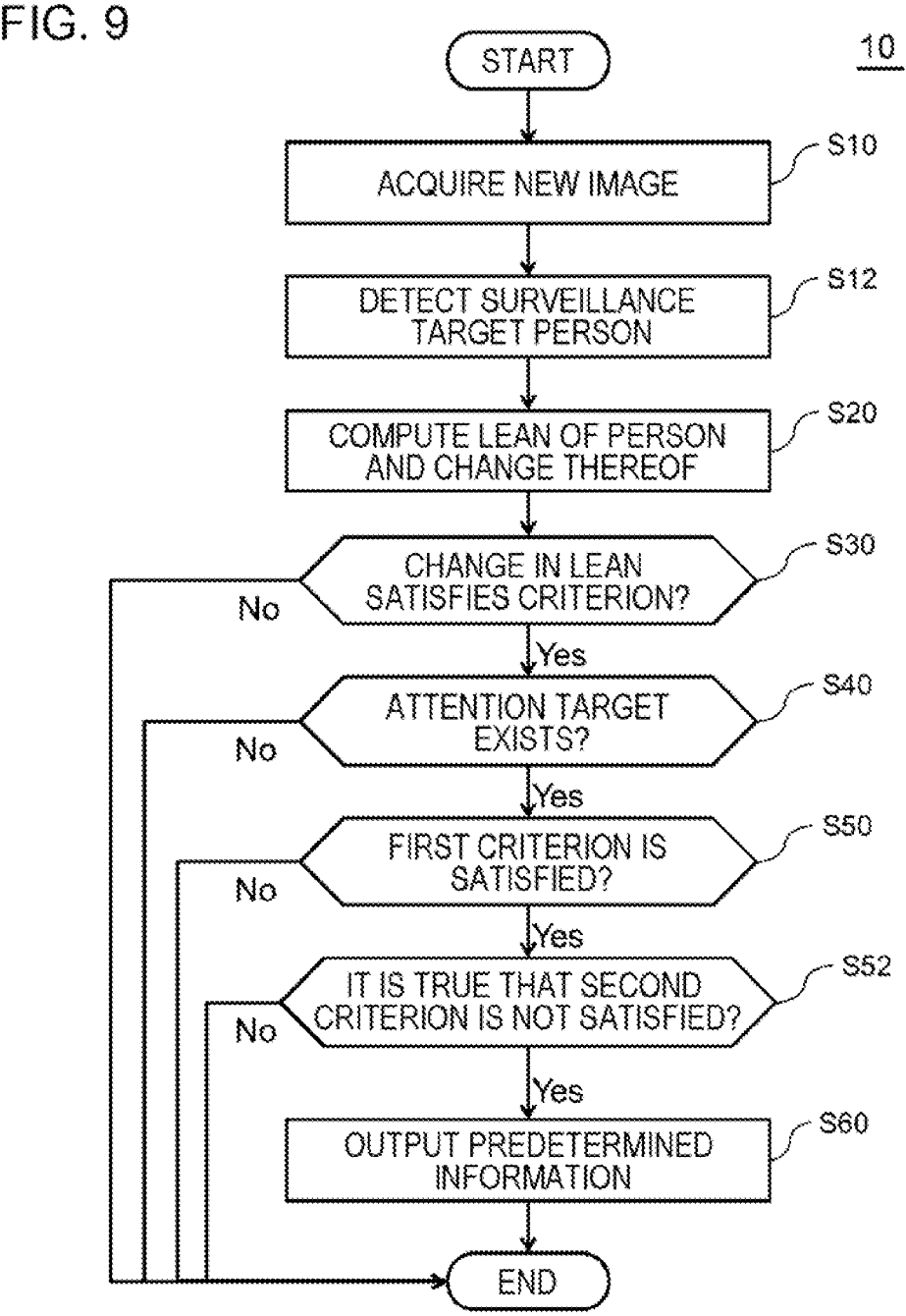
FIG. 9 is a flowchart according to a modified example 2 in FIG.

FIG. 9 is a flowchart according to a modified example 2 in FIG. 7. In the present modified example, at least one image capturing apparatus 20 is placed at an entrance of a target area. Then, an image processing unit 110 of an image processing apparatus 10 processes an image generated by the image capturing apparatus 20, thereby selects a surveillance target person, and stores a feature value of the surveillance target person in a storage unit 130. Herein, the surveillance target person is at least one of, for example, a child, a woman, and an aged person. Moreover, the image processing unit 110 also stores a feature value of a companion of the surveillance target person in the storage unit 130. Herein, a determination criterion of being a companion is as described in the example embodiment.

Then, the image processing apparatus 10 processes an image generated by another image capturing apparatus 20, and thereby executes processing indicated in the modified example 1, regarding the surveillance target person.

Specifically, when acquiring a new image from the image capturing apparatus 20 (step S10), the image processing unit 110 of the image processing apparatus 10 detects a feature value of a person included in the image, and a position thereof, and also detects an object included in the image, and a position thereof. The object detected herein is at least an object (e.g., a vehicle or a building) that can become an attention target. Moreover, the image processing unit 110 detects a feature value of a person included in the image, and determines whether the detected feature value corresponds to a feature value of the surveillance target person stored in the storage unit 130. Thereby, the image processing unit 110 detects the surveillance target person (step S12). Then, the image processing unit 110 and a determination unit 120 perform processing in and after step S20, for the surveillance target person detected in step S12.

Note that, in the present modified example, separation of a surveillance target person (e.g., a child) from a companion (e.g., a parent) at equal to or more than a given distance may be used as a first criterion. In this case, a distance between the surveillance target person and the companion becoming less than a given distance within a predetermined time is used as a second criterion.

Moreover, in the present modified example, the determination unit 120 may output predetermined information when a body line of not the surveillance target person but the companion leans (e.g., lying or the like) equal to or more than a criterion value, and, thereafter, a distance between the surveillance target person and the companion is increased by equal to or more than a criterion value. In this instance, a feature value of a person positioned at transition of the surveillance target person and the companion may be stored in the storage unit 130 as a feature value of a person requiring special attention. Thereafter, the image processing apparatus 10 may perform tracking of the person requiring special attention, by processing images generated by a plurality of the image capturing apparatuses 20.

Note that, when a target area is within a facility such as an airport or a shopping mall, at least one image capturing apparatus 20 is placed at an entrance to the facility, and at least one image capturing apparatus 20 is placed at an exit from the facility. Herein, when the entrance and the exit are the same, at least one image capturing apparatus 20 is placed at the entrance/exit. Then, the determination unit 120 may output predetermined information when the surveillance target person exits from the facility together with a person other than the companion, or when the surveillance target person is not allowed to be detected at the exit even after elapse of a given time (e.g., a case of being pressed into a bag, or the like is assumed). Particularly when the surveillance target person exits from the facility together with a person other than the companion, an output destination of predetermined information may be a guard (or a police officer) being present at a gate placed at the exit, or the exit.

The example embodiments of the present invention have been described above with reference to the drawings, but are exemplifications of the present invention, and various configurations other than the above can also be adopted.

Moreover, although a plurality of steps (pieces of processing) are described in order in a plurality of flowcharts used in the above description, an execution order of steps executed in each example embodiment is not limited to the described order. In each example embodiment, an order of illustrated steps can be changed to an extent that causes no problem in terms of content. Moreover, each example embodiment described above can be combined to an extent that content does not contradict.

Some or all of the above-described example embodiments can also be described as, but are not limited to, the following supplementary notes.

1. An image processing apparatus including:
    an image processing unit that processes a plurality of images including a first person and being generated at timings differing from each other; and
    a determination unit that outputs predetermined information by use of a processing result of the image processing unit, in which
    the image processing unit
        detects a change in an angle of a body of the first person, by processing the plurality of images, and
        detects, at least when magnitude of the change satisfies a criterion, information relating to an attention target being a second person or an object existing in a direction in which the body leans, and
    the determination unit outputs the predetermined information, when a first criterion relating to at least one of the attention target and the first person is satisfied.
2. The image processing apparatus according to supplementary note 1, in which
    the attention target is the second person, and
    the first criterion includes a matter indicating that the second person is not a companion of the first person.
3. The image processing apparatus according to supplementary note 1, in which
    the attention target is the second person,
    the image processing unit detects a position of the first person and a position of the second person, in each of the plurality of images, and
    the first criterion includes a matter indicating that, before magnitude of the change satisfies the criterion, a distance between the first person and the second person is wide at equal to or more than a criterion distance continuously for equal to or more than a criterion time.
4. The image processing apparatus according to supplementary note 1, in which
    the attention target is a car, and the first criterion is that, after magnitude of the change satisfies the criterion, the first person is not allowed to be sensed any more within a criterion time, without framing out.

5. The image processing apparatus according to supplementary note 1, in which
the first criterion is that the attention target exists, and an attribute of
the first person satisfies a criterion.

6. An image processing method including,
performing, by a computer:
image processing of processing a plurality of images including a first person and being generated at timings differing from each other; and
determination processing of outputting predetermined information by use of a processing result of the image processing, in which,
the computer,
in the image processing,
detects a change in an angle of a body of the first person, by processing the plurality of images,
detects, at least when magnitude of the change satisfies a criterion, information relating to an attention target being a second person or an object existing in a direction in which the body leans, and,
in the determination processing, outputs the predetermined information, when a first criterion relating to at least one of the attention target and the first person is satisfied.

7. The image processing method according to supplementary note 6, in which
the attention target is the second person, and
the first criterion includes a matter indicating that the second person is not a companion of the first person.

8. The image processing method according to supplementary note 6, in which
the attention target is the second person,
the image processing method further including, by the computer,
in the image processing, detecting a position of the first person and a position of the second person, in each of the plurality of images, in which
the first criterion includes a matter indicating that, before magnitude of the change satisfies the criterion, a distance between the first person and the second person is wide at equal to or more than a criterion distance continuously for equal to or more than a criterion time.

9. The image processing method according to supplementary note 6, in which
the attention target is a car, and
the first criterion is that, after magnitude of the change satisfies the criterion, the first person is not allowed to be sensed any more within a criterion time, without framing out.

10. The image processing method according to supplementary note 6, in which
the first criterion is that the attention target exists, and an attribute of the first person satisfies a criterion.

11. A program causing a computer to include:
an image processing function of processing a plurality of images including a first person and being generated at timings differing from each other; and
a determination function of outputting predetermined information by use of a processing result of the image processing function, in which
the image processing function
detects a change in an angle of a body of the first person, by processing the plurality of images, and
detects, at least when magnitude of the change satisfies a criterion, information relating to an attention target being a second person or an object existing in a direction in which the body leans, and
the determination function outputs the predetermined information, when a first criterion relating to at least one of the attention target and the first person is satisfied.

12. The program according to supplementary note 11, in which
the attention target is the second person, and
the first criterion includes a matter indicating that the second person is not a companion of the first person.

13. The program according to supplementary note 11, in which
the attention target is the second person,
the image processing function detects a position of the first person and a position of the second person, in each of the plurality of images, and
the first criterion includes a matter indicating that, before magnitude of the change satisfies the criterion, a distance between the first person and the second person is wide at equal to or more than a criterion distance continuously for equal to or more than a criterion time.

14. The program according to supplementary note 11, in which
the attention target is a car, and
the first criterion is that, after magnitude of the change satisfies the criterion, the first person is not allowed to be sensed any more within a criterion time, without framing out.

15. The program according to supplementary note 11, in which
the first criterion is that the attention target exists, and an attribute of the first person satisfies a criterion.

REFERENCE SIGNS LIST

10 Image processing apparatus
20 Image capturing apparatus
30 External apparatus
110 Image processing unit
120 Determination unit
130 Storage unit

What is claimed is:
1. An image processing apparatus comprising:
at least one memory configured to store instructions; and
at least one processor configured to execute the instructions to perform operations comprising:
receiving a plurality of images including a first person, the plurality of images being generated at timings differing from each other;
detecting a change in an angle of a body of the first person by the plurality of images including the first person;
detecting information relating to an attention target in response to determining that magnitude of the change satisfies a criterion, the attention target including a second person or an object existing in a direction in which the body leans; and
outputting predetermined information, in response to determining that a first criterion relating to at least one of the attention target or the first person is satisfied.

2. The image processing apparatus according to claim 1, wherein
the attention target is the second person, and
the first criterion includes a matter indicating that the second person is not a companion of the first person.

3. The image processing apparatus according to claim 1, wherein
the attention target is the second person,
wherein the at least one processor is further configured to execute the instructions to perform operations comprising detecting a position of the first person and a position of the second person, in each of the plurality of images, and
wherein the first criterion includes a matter indicating that, before magnitude of the change satisfies the criterion, a distance between the first person and the second person is wide at equal to or more than a criterion distance continuously for equal to or more than a criterion time.

4. The image processing apparatus according to claim 1, wherein
the attention target is a car, and
the first criterion is that, after magnitude of the change satisfies the criterion, the first person is not detected within a criterion time without framing out.

5. The image processing apparatus according to claim 1, wherein
the first criterion is that the attention target exists, and an attribute of the first person satisfies a criterion.

6. An image processing method comprising,
performing, by a computer:
receiving a plurality of images including a first person, the plurality of images being generated at timings differing from each other;
detecting a change in an angle of a body of the first person by the plurality of images including the first person;
detecting information relating to an attention target in response to determining that magnitude of the change satisfies a criterion, the attention target including a second person or an object existing in a direction in which the body leans; and
outputting predetermined information, in response to determining that a first criterion relating to at least one of the attention target or the first person is satisfied.

7. The image processing method according to claim 6, wherein
the attention target is the second person, and
the first criterion includes a matter indicating that the second person is not a companion of the first person.

8. The image processing method according to claim 6, wherein
the attention target is the second person,
wherein the method further comprises detecting a position of the first person and a position of the second person, in each of the plurality of images, and
wherein the first criterion includes a matter indicating that, before magnitude of the change satisfies the criterion, a distance between the first person and the second person is wide at equal to or more than a criterion distance continuously for equal to or more than a criterion time.

9. The image processing method according to claim 6, wherein
the attention target is a car, and
the first criterion is that, after magnitude of the change satisfies the criterion, the first person is not detected within a criterion time without framing out.

10. The image processing method according to claim 6, wherein
the first criterion is that the attention target exists, and an attribute of the first person satisfies a criterion.

11. A non-transitory computer-readable medium storing a program for causing a computer to execute operations comprising:
receiving a plurality of images including a first person, the plurality of images being generated at timings differing from each other;
detecting a change in an angle of a body of the first person by the plurality of images including the first person;
detecting information relating to an attention target in response to determining that magnitude of the change satisfies a criterion, the attention target including a second person or an object existing in a direction in which the body leans; and
outputting predetermined information, in response to determining that a first criterion relating to at least one of the attention target or the first person is satisfied.

12. The non-transitory computer-readable medium according to claim 11, wherein
the attention target is the second person, and
the first criterion includes a matter indicating that the second person is not a companion of the first person.

13. The non-transitory computer-readable medium according to claim 11, wherein
the attention target is the second person,
wherein the program causes to the computer to further execute operations comprising detecting a position of the first person and a position of the second person, in each of the plurality of images, and
wherein the first criterion includes a matter indicating that, before magnitude of the change satisfies the criterion, a distance between the first person and the second person is wide at equal to or more than a criterion distance continuously for equal to or more than a criterion time.

14. The non-transitory computer-readable medium according to claim 11, wherein
the attention target is a car, and
the first criterion is that, after magnitude of the change satisfies the criterion, the first person is not detected within a criterion time without framing out.

15. The non-transitory computer-readable medium according to claim 11, wherein
the first criterion is that the attention target exists, and an attribute of the first person satisfies a criterion.

* * * * *